US010706085B2

(12) United States Patent
Rodgers

(10) Patent No.: US 10,706,085 B2
(45) Date of Patent: Jul. 7, 2020

(54) METHOD AND SYSTEM FOR EXPOSING VIRTUAL ASSISTANT SERVICES ACROSS MULTIPLE PLATFORMS

(71) Applicant: Oracle International Corporation, Redwood Shores, CA (US)

(72) Inventor: Michael Patrick Rodgers, Rochester, MN (US)

(73) Assignee: Oracle International Corporation, Redwood Shores, CA (US)

( * ) Notice: Subject to any disclaimer, the term of this patent is extended or adjusted under 35 U.S.C. 154(b) by 227 days.

(21) Appl. No.: 15/860,990

(22) Filed: Jan. 3, 2018

(65) Prior Publication Data

US 2019/0205461 A1 Jul. 4, 2019

(51) Int. Cl.
*G06F 15/16* (2006.01)
*G06F 16/332* (2019.01)
*H04L 29/06* (2006.01)
*G06F 9/54* (2006.01)
*H04L 29/08* (2006.01)

(52) U.S. Cl.
CPC .......... *G06F 16/3329* (2019.01); *G06F 9/541* (2013.01); *H04L 29/06068* (2013.01); *H04L 67/2823* (2013.01); *H04L 67/38* (2013.01); *H04L 69/08* (2013.01)

(58) Field of Classification Search
CPC .................................................. G06F 16/3329
USPC ....................................................... 709/230
See application file for complete search history.

(56) References Cited

U.S. PATENT DOCUMENTS

| 6,275,789 | B1 | 8/2001 | Moser et al. | |
|---|---|---|---|---|
| 6,549,937 | B1* | 4/2003 | Auerbach | H04L 29/06 709/206 |
| 6,829,603 | B1 | 12/2004 | Chai et al. | |
| 9,082,402 | B2* | 7/2015 | Yadgar | G10L 15/19 |
| 9,973,269 | B2 | 5/2018 | Sarkar et al. | |
| 10,075,828 | B2 | 9/2018 | Horton et al. | |
| 10,417,346 | B2* | 9/2019 | Kim | G06F 17/279 |
| 2008/0140861 | A1* | 6/2008 | Kothari | H04L 67/02 709/246 |
| 2013/0152092 | A1* | 6/2013 | Yadgar | G10L 15/19 718/102 |
| 2013/0268260 | A1* | 10/2013 | Lundberg | G06F 17/28 704/8 |
| 2015/0066817 | A1* | 3/2015 | Slayton | G06N 5/04 706/11 |

(Continued)

*Primary Examiner* — Hamza N Algibhah
(74) *Attorney, Agent, or Firm* — Invoke

(57) ABSTRACT

Techniques for exposing virtual assistant skills as authorable content items interpretable across multiple platforms are disclosed. In an embodiment, a query system comprises an execution engine and a plurality of wrapper services including (a) a first wrapper service for converting messages between a first protocol of a first virtual assistant platform and a target protocol and (b) a second wrapper service for converting messages between a second protocol of a second virtual assistant platform and the target protocol. The query system may receive a specification for a skill and requests from the plurality of virtual assistant platforms that invoke the skill. The wrapper services convert the requests to a target protocol consumable by the execution engine and convert responses from the execution engine a protocol consumable by the virtual assistant platform through which the request originated.

20 Claims, 5 Drawing Sheets

(56) References Cited

U.S. PATENT DOCUMENTS

| | | | |
|---|---|---|---|
| 2015/0067503 A1* | 3/2015 | Slayton | G06F 9/453 715/708 |
| 2017/0090589 A1* | 3/2017 | Sharma | G06F 3/017 |
| 2017/0093781 A1* | 3/2017 | Sharma | H04L 51/18 |
| 2018/0308473 A1* | 10/2018 | Scholar | G06F 17/21 |
| 2019/0130915 A1* | 5/2019 | Nitz | G10L 15/1822 |

* cited by examiner

METHOD AND SYSTEM FOR EXPOSING VIRTUAL ASSISTANT SERVICES ACROSS MULTIPLE PLATFORMS

RELATED APPLICATIONS; INCORPORATION BY REFERENCE

This application is related to U.S. application Ser. No. 15/712,480, filed Sep. 22, 2017, which is hereby incorporated by reference.

TECHNICAL FIELD

The present disclosure relates to virtual assistants. In particular, the present disclosure relates to a framework through which virtual assistant applications may be authored and deployed such that the applications are interpretable across multiple platforms.

BACKGROUND

A virtual assistant is a software agent used to perform automated tasks, sometimes referred to as skills, abilities, or actions. A virtual assistant may accept an instruction from a user via voice commands and/or text commands. For example, a virtual assistant may receive a voice command to obtain a weather forecast through a smart speaker or another microphone-enabled network host. Alternatively, the virtual assistant may receive the command from a user via text commands, such as through a chat interface or short message service (SMS) message. Responsive to receiving the command, the virtual assistant may obtain the weather forecast from an associated network service and present the weather forecast to the requesting user.

Many virtual assistant providers have released virtual assistant frameworks, which are platforms that empower developers to create new skills for a virtual assistant. A virtual assistant framework generally includes a collection of application programming interfaces (APIs), code samples, libraries, documentation, and other tools to facilitate the creation of new skills. For example, the virtual assistant framework may provide tools for converting an audio stream to words and performing natural language processing on the audio stream. Thus, the virtual assistant framework allows developers to quickly expose services through a natural language interface.

Many virtual assistant platforms are not cross-compatible with other virtual assistant platforms. As a result, developers typically implement separate skills for each platform through which the developer would like to expose a service. For example, a developer may create one skill to expose a weather forecast through one vendor's line of smart speakers. The developer may then create a separate skill to expose the weather forecast through another vendor's line of smart speakers. This approach may be time-consuming and gives rise to a multiple-maintenance scenario. If a service is updated or expanded, then each separate skill must also be updated for each supported platform. Also, skills that expose the same underlying service may diverge in behavior from one platform to another. Different skills may have different user interfaces, different abilities, different invocations, and/or different bugs. This divergent behavior complicates usability, documentation, manageability, and performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. MULTI-PLATFORM VIRTUAL ASSISTANT SYSTEM
3. VIRTUAL ASSISTANT SERVICE CREATION AND PUBLICATION
4. CROSS-PLATFORM EXECUTION
5. CONTEXT-BASED VIRTUAL ASSISTANT DIALOGUE
6. HARDWARE OVERVIEW
7. MISCELLANEOUS; EXTENSIONS

1. General Overview

Techniques are described for exposing virtual assistant services as authorable content items that are interpretable across multiple platforms. Users may author platform-agnostic specifications for virtual assistant services, such as interactive natural language skills and actions. A platform-agnostic specification may be created without knowing any platform-specific code or implementation details. A platform-agnostic specification may be defined and viewed as a state diagram. An authoring tool may allow users to add nodes (states) to the state diagram, including text with which a virtual assistant system should respond, what input is expected, what states to transition to based upon user input, and what operations to execute.

In an embodiment, a query system includes an execution engine that interprets platform-agnostic specifications to provide virtual assistant services across multiple virtual assistant platforms. The execution engine may track the state and execute the appropriate logic at each state to perform the functions specified. The executed functions may cause the execution engine to advance to the next appropriate state based on user input. The query system may accept user input and return outputs in a variety of protocols, which may vary from one virtual assistant platform to the next.

In an embodiment, the query system includes a set of wrapper services. A wrapper service serves as a bridge between the execution engine and a virtual assistant platform. The wrapper service may convert messages received from the virtual assistant platform to a protocol (referred to herein as the "target protocol") consumable by the execution engine. The wrapper service may convert responses from the execution engine to a protocol consumable by the virtual assistant platform through which the request originated. The wrapper services allow for a single content item embodying a virtual assistant service to be authored once using the authoring tool and interpreted across multiple virtual assistant platforms.

One or more embodiments described in this Specification and/or recited in the claims may not be included in this General Overview section.

2. Multi-Platform Virtual Assistant System

Figure 1:
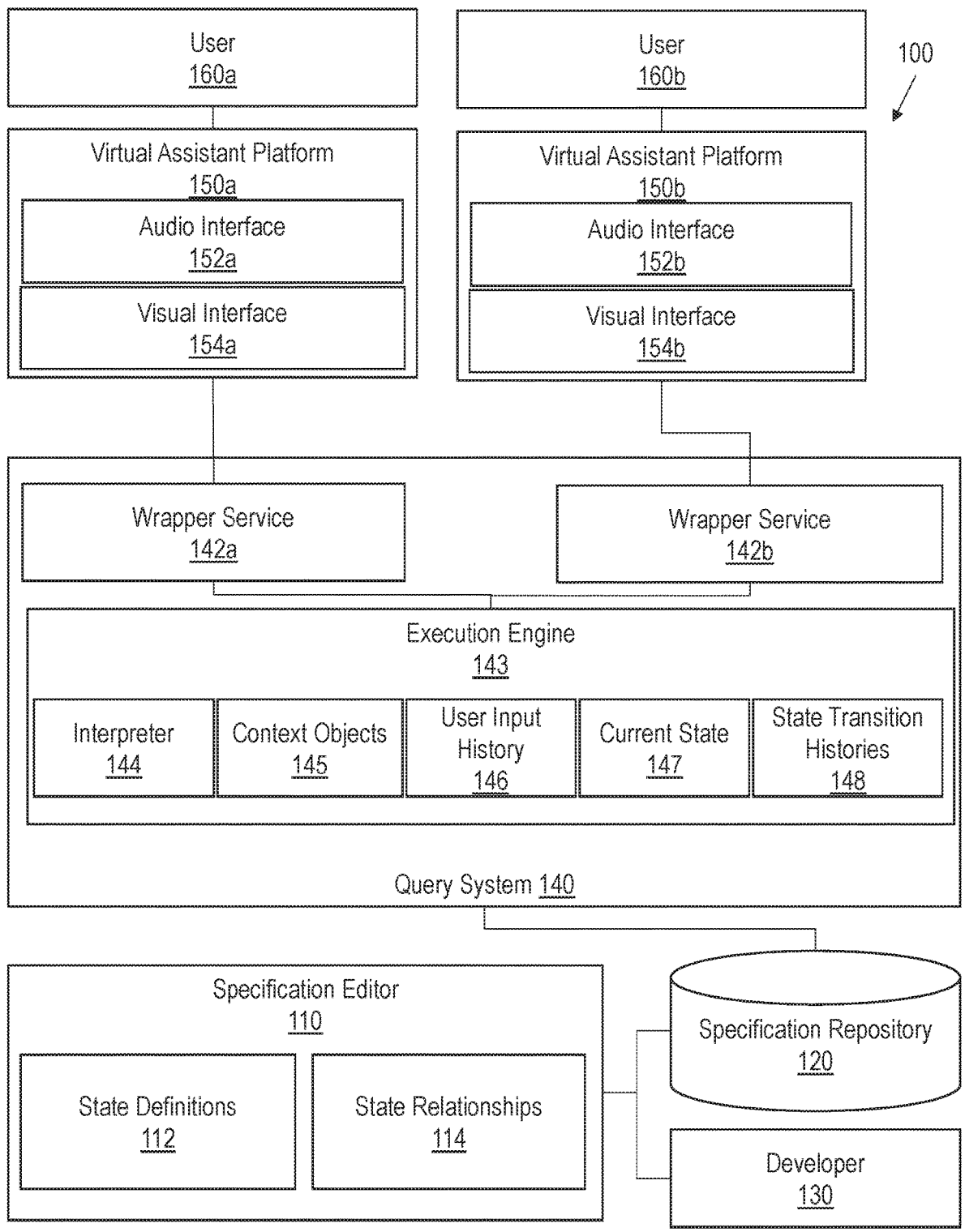
FIG. 1 illustrates a system in accordance with one or more embodiments.

FIG. 1 illustrates a system 100 in accordance with one or more embodiments. As illustrated in FIG. 1, system 100 includes specification editor 110, specification repository 120, query system 140, and virtual assistant platforms 150*a-b*. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, system 100 executes virtual assistant services, based on input from one or more users, such as users 160*a-b*. A virtual assistant service, as used herein, may be a skill, ability, action, or other application that performs one or more automated task based on voice or text input, which may follow a natural language format. Example virtual assistant services include, but are not limited to, making a travel arrangement, accessing a cloud service, initiating playback of an audio file, controlling a smart home device, giving directions, displaying a requested image, and transferring funds between accounts. One or more steps for a virtual assistant service may be executed based on a dialogue with one of users 160*a-b*. A dialogue may comprise inputs received by a user and outputs generated by system 100. The dialogue may include an initial request from one of users 160*a-b*. The dialogue may include a response, from system 100, that resolves the user request. The dialogue may include a request, generated by system 100, for additional information from users 160*a-b*.

In one or more embodiments, virtual assistant platform 150*a* includes hardware and/or software configured to access and/or provide virtual assistant services to users 160*a-b*. A virtual assistant platform may receive and process natural language inputs from a user. A natural language input may be an audio or text-based input. For example, a user may ask, "What is the weather today?" via a voice or text input. As another example, a user may command "Increase the temperature on my thermostat by two degrees" via a voice or text input.

In an embodiment, a visual assistant platform is integrated into a smart speaker. A smart speaker may be a voice command device that listens for one or more "hot words" to provide hands-free activation of the virtual assistant. Once activated, the smart speaker receives voice input from a user. The smart speaker may also playback audio to the user. The smart speaker may transmit information to and from query system 140. The smart speaker may be implemented as a stand-alone device, or as part of a digital device such as a smartphone, tablet, or computer.

In one or more embodiments, a virtual assistant platform provides an audio interface and/or a visual interface. For example, virtual assistant platforms 150*a* includes audio interface 152*a* and visual interface 154*a*. Virtual assistant platform 150*b* includes audio interface 152*b* and visual interface 154*b*. An audio interface refers to hardware and/or software configured to facilitate audio communication between a user and a virtual assistant platform. An audio interface, such as audio interfaces 142*a-b*, may include a speaker to play audio. The played audio may include verbal questions and answers comprising a dialogue following a natural language format. The audio interface may include a microphone to receive audio. The received audio may include requests and other information received from users 160*a-b*.

A visual interface refers to hardware and/or software configured to facilitate visual communications between a user and a virtual assistant platform. A visual interface renders user interface elements and receives input via user interface elements. Examples of visual interfaces include a graphical user interface (GUI) and a command line interface (CLI). Examples of user interface elements include checkboxes, radio buttons, dropdown lists, list boxes, buttons, toggles, text fields, date and time selectors, command lines, sliders, pages, and forms. A visual interface, such as visual interfaces 154*a-b*, may present a messaging interface. The messaging interface may be used to accept typed input from a user. The messaging interface may be used to display text to the user. The visual interface may include functionality to display images, such as maps and pictures. The visual interface may include functionality to upload an image. As an example, user 160*a* may upload a picture of an animal, along with the natural language text, "What is this?".

In one or more embodiments, virtual assistant platforms 150*a-b* are communicatively coupled to query system 140. Query system 140 may support several different virtual assistant platforms that communicate according to different protocols. For example, query system 140 may be communicatively coupled to smart speakers from different vendors. Additionally or alternatively, query system 140 may be communicatively coupled to text-based platforms, such as virtual assistants accessible through a chat interface. Different virtual assistant platforms may process natural language inputs using different APIs, libraries, and code samples.

Virtual assistant platforms 150*a-b* may convert voice input to text using speech recognition techniques. For example, a virtual assistant platform may digitize and/or filter received voice input. The virtual assistant platform may compare the voice input to stored template sound samples to identify words or phrases. The virtual assistant platform may separate the voice input into components for comparison with sounds used in a particular language. The virtual assistant platform may map utterances in the voice input to intents. An intent in this context represents a request to perform an action that fulfills a user's spoken request, as embodied in an utterance. An utterance may be a spoken word or phrase within the voice input.

In one or more embodiments, virtual assistant platforms 150*a-b* generate and transmit request messages to query system 140. Request messages may vary in format from one virtual assistant platform to the next depending on the protocol implemented by the virtual assistant platform. For example, one virtual assistant platform may generate a JavaScript Object Notation (JSON) request that includes a set of intents, extracted from the voice input, that are structured in accordance with a protocol implemented by the platform. A different virtual assistant platform may generate an extensible markup language (XML) object that maps utterances to intents using a different format and protocol. Other request message formats may also be used, which generally vary between different providers/vendors of virtual assistant platforms.

Query system 140 includes a plurality of wrapper services, such as wrapper service 142a and wrapper service 142b. A wrapper service serves as a bridge between a virtual assistant platform and execution engine 143. For example, virtual assistant platform 150a may be a smart speaker that creates JSON requests based on voice inputs received from user 160a. The JSON request may be formatted based on a protocol supported by the vendor's platform. Wrapper service 142a, which may be a web service or other application, may convert the JSON requests to a target protocol consumable by execution engine 143. Virtual assistant platform 150b may be a smart speaker that creates requests based on voice inputs received from user 160b. Virtual assistant platform 150b may be designed by a different vendor that formats requests according to a different protocol than virtual assistant platform 150a. Wrapper service 142b may be implemented an independent web service/application that convert requests from virtual assistant platform 150b to the target protocol consumable by execution engine 143. Other wrapper services may also be deployed to provide support for the additional virtual assistant platforms.

In an embodiment, execution engine 143 includes interpreter 144. Interpreter 144 interprets specifications for virtual assistant services, such as skills and abilities. Interpreter 144 may load and interpret specifications based on dialogues with end users. For example, a user may invoke a SetThermostat virtual assistant service by issuing the following voice command: "Set downstairs temperature to 72 degrees". One of wrapper services 142a-b may convert the request to a target protocol consumable by execution engine 143. The wrapper service used may vary depending on the virtual assistant platform servicing the request. Responsive to receiving the converted request, interpreter 144 may load the specification for SetThermostat service. The interpreter may then execute one or more operations in accordance with the specification, such as sending a signal to a paired thermostat to set the hold temperature to 72 degrees. The operations that are performed may vary depending on the specification and intents extracted from the natural language input.

In an embodiment, the query system 110 retrieves data from the user communication device 120. As an example, the query system may query the user communication device 120 to determine a location via a Global Positioning System (GPS) functionality of the user communication device 120. As another example, the query system 110 may query the user communication device 120 to determine if the user is free at a particular time, by accessing data associated with a calendar application stored to the user communication device 120.

Execution engine 143 may further determine operations to execute, based on a context. Execution engine 143 may determine the context based on analyzing user input. Execution engine 143 may determine the context based on user input history 146. Execution engine 143 may determine a context based on a state.

In an embodiment, context objects 145 are objects that stores contextual information about dialogues. A context object may be transmitted back and forth between a virtual assistant platform and query system 140 over the course of a dialogue. The context object may store information to reflect the last operation executed by execution engine 143. A context object may store information to reflect user input history 146. A context object may store information to reflect a current state 147 and/or state transition history 148.

In an embodiment, the user input history 146 is a record of user input over the course of one or more dialogues. User input history 146 may include information about the sequence of a series of voice inputs. User input history 146 may categorize user input by type. For example, the user makes a weather-related request every morning at 8 am.

In an embodiment, context objects 145 store state information. Each state may be assigned a respective state identification number. The query system may use the state information to determine one or more operations to execute in association with a particular state. As an example, in state 1, the user communication device plays the audio, "Hello," and accepts a user response. In state 2, the user communication device plays the audio, "How are you today?".

In an embodiment, context object 145 store information about a current state 147. The current state is the state associated with a particular context object at a particular time. The current state may be associated with a unique state identifier. The current state may be denoted by, for example, a number, hexadecimal, or verbal description.

In an embodiment, context objects 145 store state transition histories 148. A state transition history may include an ordered sequence of states. A state transition history may include a set of previous states in a current dialogue. A state transition history may include a series of states in a prior dialogue. The state transition history may correlate state transitions with user input and/or information retrieved by execution engine 143.

In an embodiment, the query system 140 is implemented remotely from virtual assistant platforms 150a-b. Query system 140 may execute on a cloud network. Query system 140 may perform virtual assistant services locally and/or retrieve information from one or more external servers. As an example, query system 140 may access external web services, cloud applications, and smart home devices.

In an embodiment, specification editor 110 is an application for configuring virtual assistant services, such as skills, abilities, actions, and/or other applications. Specification editor 110 may allow specification for new virtual assistant services to be defined in a platform-agnostic fashion with little to no coding. Execution engine 143 may interpret the same specification across several different virtual assistant platforms. The wrapper services may handle conversion to different virtual assistant platform protocols. The separation allows for greater manageability and flexibility. For example, if developer 130 would like to modify an existing service, then the corresponding specification may be updated without having to modify the logic of wrapper services 142-b. In addition, changes to a virtual assistant platform protocol may be handled by updating the corresponding wrapper service. The other wrapper services and skill specifications do not need to be updated. New virtual assistant platforms may also be supported with In an embodiment, specification defines a state diagram. The state diagram can be interpreted during runtime to generate code corresponding to an application for executing a particular task. Specification editor 110 may render user interface elements and receive input via user interface elements. As previously indicated, examples of visual interfaces include a graphical user interface (GUI) and a command line interface (CLI). Examples of user interface elements include checkboxes, radio buttons, dropdown lists, list boxes, buttons, toggles, text fields, date and time selectors, command lines, sliders, pages, and forms.

In an embodiment, specification editor 110 displays movable components such as text boxes and connecting arrows. Specification editor 110 may permit developer 130 to rearrange the components. The components are associated with state information. By rearranging the state-defining components, developer 130 can modify the operations to be executed by execution engine 143 in association with a particular virtual assistant service.

In an embodiment, a specification for a virtual assistant service includes state definitions 112. A state definition is an element of the specification that describes a particular state. State definitions 112 may include information to be requested in association with a state. Each state may represent a different node within a state diagram. As an example, state definitions 112 may define a series of audio messages for one or more states. For example, one state may include the audio message, "What is your address?". Another state may include the audio message "What is your first name?". Another state may include the audio message "What is your last name?".

A state definition may include an expected user input associated with the state. As an example, in a particular state, execution engine may be configured to receive an address. A state definition may associate the user input with a particular variable. In the previous example, the specification may be interpreted to assign an input value to the variable address. A state definition may define slots corresponding to information to be received in a particular state. As an example, a state definition may define a slot, {name}, for passing a name received via user input.

In an embodiment, state relationships 106 define relationships between two or more states. Visually, the state relationships 106 may be presented, via the UI, as edges, such as lines or arrows connecting state nodes. State relationships 106 may define transition between different nodes in the state definitions. The transitions may represent a flow of states in a dialogue. As an example, in a particular state, execution engine 143 may be configured to receive a "yes" or "no" response while interpreting the specification. Based on whether the response is "yes" or "no," the execution engine may generate a response message that includes directions or a goodbye message.

In an embodiment, execution engine 143 includes hardware and/or software configured to generate executable code, based on a specification. As an example, execution engine 143 may generate a Node.js implementation of a program to execute a series of operations as defined by the state diagram. Execution engineer 143 may transform the state diagram and associated metadata to executable code that may be run by interpreter 144. Execution engine 143 may generate code using pre-generated code blocks stored in association with nodes and connectors. Execution engine 143 may generate code to include custom code defined by a user via the query system definition interface.

In an embodiment, the executable code may be invoked by different virtual assistant platforms that communicate using different protocols. For example, the executable code may be invokes through JSON requests, HTTP requests, XML requests, which may be formatted according to different platform protocols. Wrapper services may convert the requests to a target protocol that invokes the executable code generated for a particular specification. Thus, a single skill specification may be defined and exposed across multiple platforms.

Specification repository 120 is configured to store specifications for virtual assistant services. The specifications may be stored responsive to a user registering or enabling the virtual assistant service with query system 140. Specification repository 120 may be any type of storage unit and/or device (e.g., a file system, database, collection of tables, or any other storage mechanism) for storing data. Further, a specification repository 120 may include multiple different storage units and/or devices. The multiple different storage units and/or devices may or may not be of the same type or located at the same physical site.

3. Virtual Assistant Service Creation and Publication

As previously mentioned, specification editor 110 allows users, such as developer 130, to define and edit specifications for virtual assistant services with minimal or no coding. The user may create a specification by generating a state diagram through a GUI. The skill may be published and accessed across various platforms, including smart speakers, chat-based interfaces, desktop clients, and SMS messages.

Figure 2:
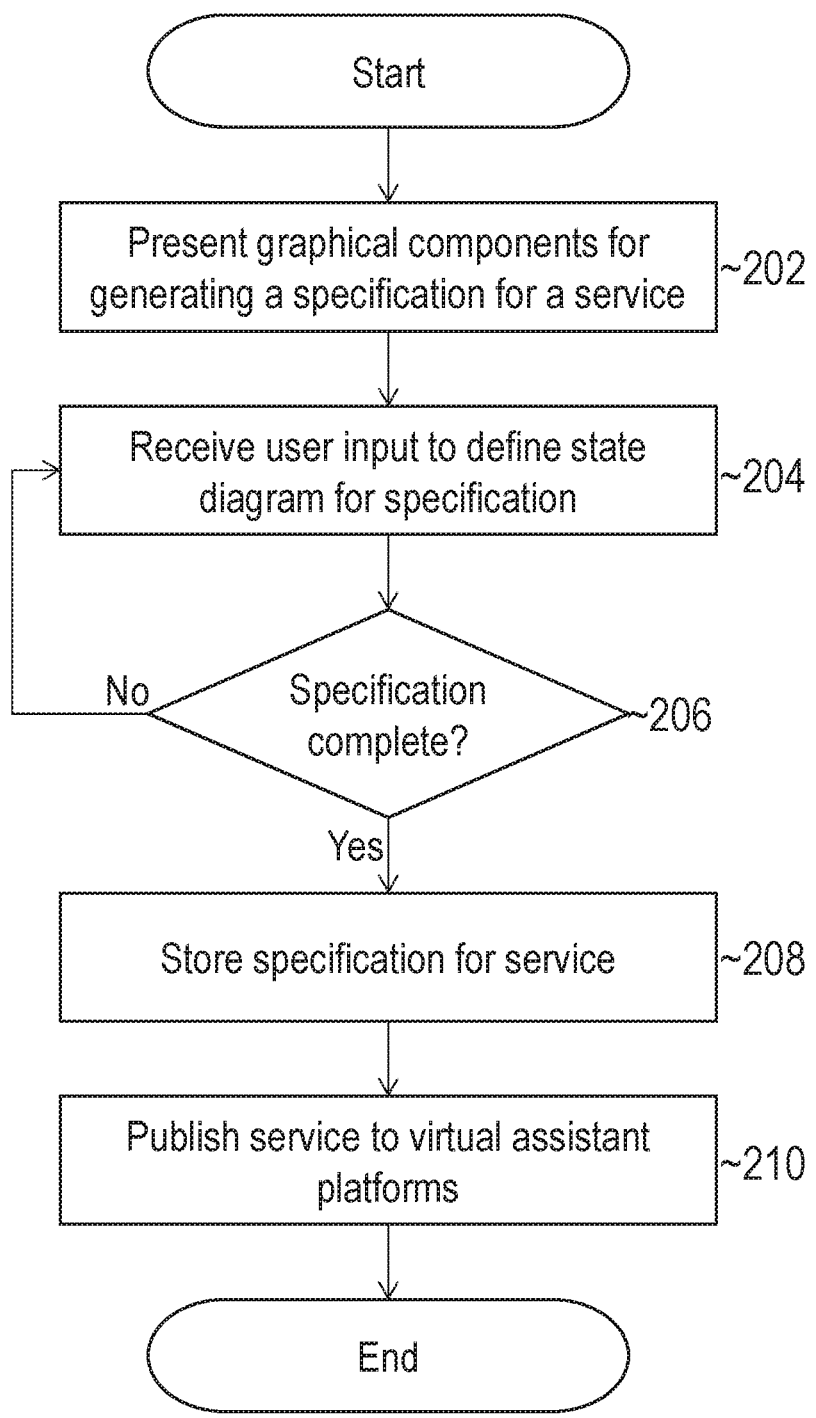
FIG. 2 illustrates an example set of operations for generating a virtual assistant skill in accordance with one or more embodiments.

FIG. 2 illustrates an example set of operations for customizing a virtual assistant application in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, specification editor 110 presents graphical components for generating a specification for a virtual assistant service (Operation 202). Specification editor 110 may present a GUI for defining one or more attributes of the virtual assistant service. As an example, specification editor allows developer 130 to input a name and description of the service.

In an embodiment, specification editor 110 presents a GUI through which developer 130 defines a state diagram for the virtual assistant service. Specification editor 110 may present GUI elements representing nodes corresponding to respective states. A node may be prefilled with text. Alternatively, or additionally, a node may be a blank text box for receiving custom user input. Specification editor 110 may present connectors, such as arrows, for linking up states into a flow chart.

In an embodiment, specification editor 110 receives user input to define a specification for a virtual assistant service (Operation 204). In an example, specification editor 110 receives input defining a state diagram for the specification. Specification editor 110 may prompt a user to drag and drop the text boxes and connectors to create a flowchart-style state diagram. Specification editor 110 may allow a user to add or remove nodes from the state diagram. Specification editor 110 may allow a user to rearrange the order in which nodes appear in the state diagram. Specification editor 110 may allow a user to insert or arrange arrows to define a flow in the state diagram.

In an embodiment, a particular state is defined with a message for the query system to present to a user. For example, a node, corresponding to state 1, may contain the text "What would you like to do today?". When the context object is in state 1, the virtual assistant platform plays or presents the message, "What would you like to do today?".

The manner in which the message is presented may be left for the virtual assistant platform to determine. For example, a smart speaker may read the message using built-in audio file samples. A chat-based interface may present the message as text. An SMS-based interface may send a text message to the user. A single node within the state diagram may accommodate the different platforms, with the wrapper services converting the message to the appropriate protocol.

Alternatively, or additionally, a state may be defined with variables corresponding to an expected user response. A state may be represented by a particular type of expected input. A state may be associated with an open-ended question. In a state associated with an open-ended question, the system may accept any response (i.e., one word or one hundred words). A state may be associated with a specific set of valid responses. As an example, a node contains the text: <Injury Occurred|Yes No>. The node corresponds to a state in which a user response of "yes" or "no" is expected.

Alternatively, or additionally, a state may be defined with an operation to be executed. When the context object is in a particular state, execution engine 143 may be configured to execute a particular operation. A state may be associated with a task, such as generating a data object, performing a calculation, and/or interacting to a third-party service. As an example, when a state may define an operation to obtain a weather report by querying a weather application.

Specification editor 110 may allow a user to assign a type to a node. As an example, a node corresponds to a state in which the system is configured to receive an open-ended response. The query system may allow a user to specify names and types for the variables associated with a node. As another example, a user enters the text <User Role: Customer|Seller>. The node is associated with the variable User Role. The node is of a type configured to accept one of two responses.

Specification editor 110 may receive user input in the form of custom execution code. As an example, a user configures a node for receiving an incident report. Specification editor 110 allows the user to enter custom implementation logic to generate a Representational State Transfer (REST) services call to add the incident in a third-party system.

Specification editor 110 may receive user input in the form of metadata. Specification editor 110 may allow a user to enter metadata specifying information such as a table in which to find a particular piece of data, or a web application to be used in executing a query.

Specification editor 110 may be used to define a platform-agnostic specification. A platform-agnostic specification may be run across multiple virtual assistant platforms, such as different smart speakers and chat-based platforms. As an example, the state-diagram is defined without any platform-specific code or protocols being invoked. Interpreter 144 may interpret the state diagram specification across multiple platforms. This approach allows natural language skills and abilities to be written once and run across several different platforms. Natural language interactions may also be revised in a single object rather than one object per supported platform.

In an embodiment, specification editor 110 determines whether the specification is complete (Operation 206). Specification editor 110 may display a button with a label such as "Complete Specification," "Export," or "Make my Application." Responsive to the user clicking the button, specification editor 110 determines that the state diagram is complete. If the user does not click the button, the query system definition interface may determine that the state diagram is not complete.

In an embodiment, if the state diagram is not complete, the specification editor 110 continues to receive user input to configure the specification (Operation 204, described above).

In an embodiment, if the specification is complete, then specification editor 110 stores the specification for the virtual assistant service in specification repository 120 (Operation 208). In some cases, specification editor 110 may generate platform-agnostic executable code that may be invoked by several different virtual assistant platforms. The executable code may be generated by interpreter 144 during runtime or may be pre-generated by specification editor 110 some other component. Executable code may be generated through a transformation process executed on the flowchart and associated metadata. As an example, interpreter 144 generates an implementation block corresponding to each state of the state diagram. A particular state may correspond to an implementation block such as a case in a switch statement or a function. The implementation block may include code to save, to the context object, input received corresponding to a variable. The implementation block may include code to generate a response object, including text to be read. The implementation block may include any custom code specified in the state diagram. The implementation block may include code to analyze the context object and execute the appropriate execution block when a packet is received.

In an embodiment, interpreter 144 assigns a unique identification (ID) number to each state in the state diagram. The state machine generator may assign numbers and/or letters to identify a particular state. Sequential states may be given sequential ID numbers.

In an embodiment, specification editor 110 publishes the service to virtual assistant platforms (Operation 210). As an example, a virtual assistant platform receives a message that a new service is available. The message may identify the name and/or other information about how to invoke the service. The virtual assistant platform may register the service as a new skill, ability, or action. A user may then invoke the registered service by issuing voice or text commands to the virtual assistant platform.

For complex software, natural language skills and other virtual assistant service can be made into a content item embodied in a user-defined object. Consumers that access the software system may author custom skills as content items. For instance, a user could create a natural-language flow to approve purchase orders, enter in time/parts on work orders, or countless other tasks. All employees would then be able to run these skills across any supported platform.

4. Cross-Platform Execution

In an embodiment, query system 140 supports queries from multiple virtual assistant platforms. For example, query system 140 may accept queries from different smart speakers, SMS-messaging platforms, and/or chat-based interfaces. The queries may be formatted according to different protocols. A smart speaker may format a query differently than an SMS message, which may be formatted differently than a chat-based query. Additionally or alternatively, different VAP service providers may follow different standards and protocols. A smart speaker from one provider/vendor may format queries differently than a smart speaker from a different provider/vendor.

Figure 3:
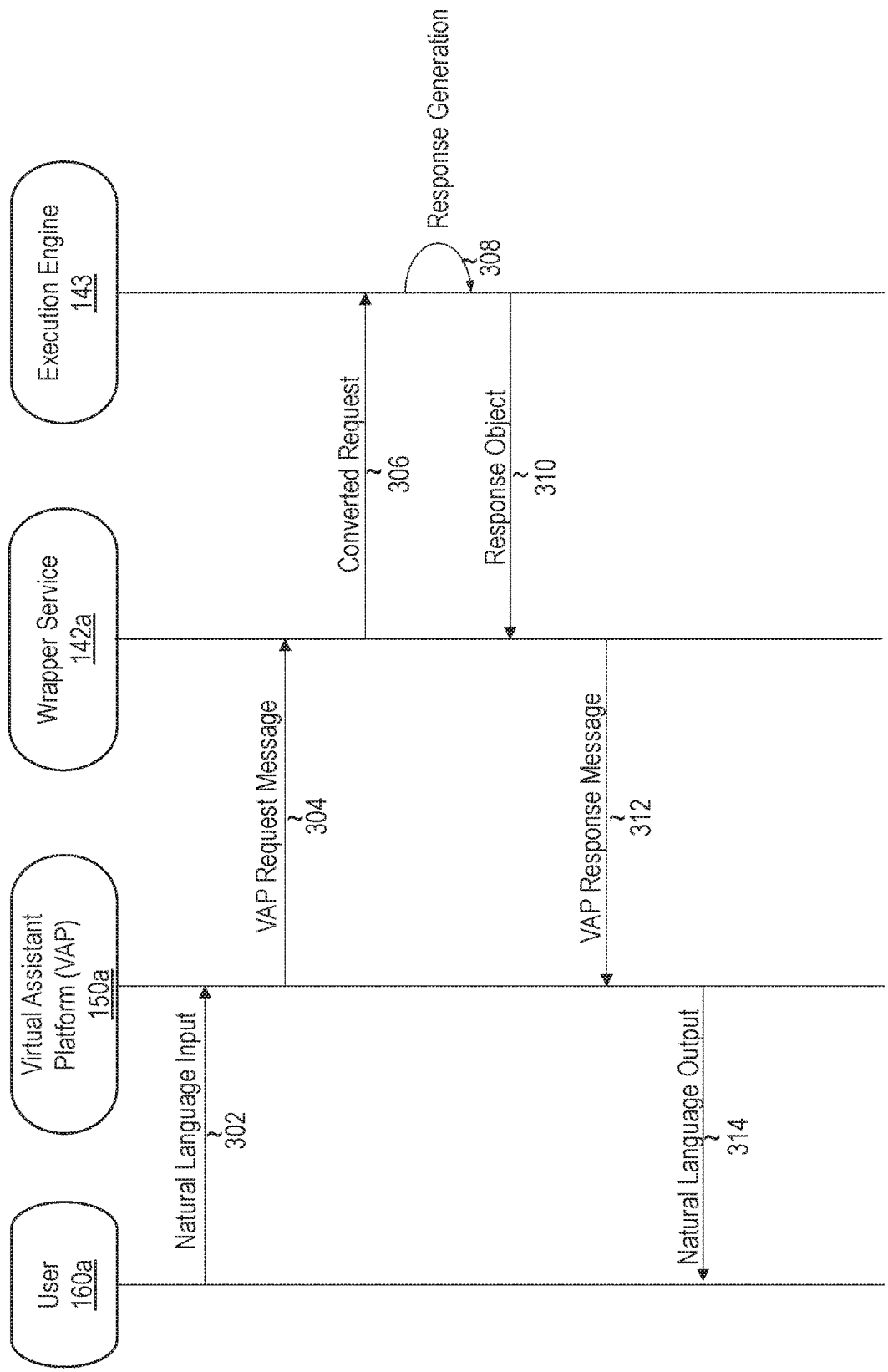
FIG. 3 illustrates an example ladder diagram for executing platform-agnostic service specifications in accordance with one or more embodiments.

FIG. 3 illustrates an example ladder diagram for executing platform-agnostic service specifications in accordance with one or more embodiments. One or more operations illustrated in FIG. 3 may be modified, rearranged, or omitted all together. Accordingly, the particular sequence of operations illustrated in FIG. 4 should not be construed as limiting the scope of one or more embodiments.

In an embodiment, VAP 150a receives a natural language input that invokes a virtual assistant service (Operation 302). As an example, user 160a asks "What's the weather today?" to invoke a weather service. As another example, a user commands "Set the thermostat 72 degrees" to invoke a thermostat service. As another example, a user commands "Order a pepperoni pizza" to invoke a pizza delivery service. Other services may be invoked, either explicitly or implicitly, by the natural language input.

In an embodiment, VAP platform 150a generates a VAP request message based on the natural language input (Operation 304). The VAP request message may contain or otherwise identify the natural language input received by user 160a. As an example, a VAP message maps the natural language input to one or more intents. The voice input "Order a large pepperoni pizza" may be mapped as follows "Application=OrderPizza service, size=large, toppings=pepperoni". The mappings may vary from one voice assistant service to another.

In an embodiment, specification editor 110 allows developer 130 to map sample utterances to intents for a specification. The mapping may be published or otherwise provided to the supported VAP platforms, including VAP platform 150a, and/or the associated wrapper services. Different VAP platforms may apply platform-specific natural language analysis. As an example, a smart speaker may map phrases within a voice input to intents. A chat-based interface may map text input to intents.

The VAP request message format may vary from one format to the next. As an example, a smart speaker platform maps voice input to elements within a JSON message. As another example, a smart speaker from a different platform maps voice inputs to elements within an XML object. The request message may follow a format defined by a VAP protocol. As previously mentioned, different VAPs may implement different protocols.

In an embodiment, wrapper service 142a converts the VAP request message to a target protocol consumable by execution engine 143 (Operation 306). The conversion process may involve extracting and/or reformatting inputs contained within the VAP request message in accordance with the target protocol. As an example, voice inputs from a smart speaker platform are extracted and mapped to intents in a request object. As another example, text inputs from a chat interface are extracted and mapped to intents in a request object.

The target protocol may vary from implementation to implementation. An example format is a JSON object. Information contained within incoming JSON, XML, HTTP or other requests may be extracted and mapped to elements in the JSON object. However, other formats may be used, including XML objects, database objects, etc.

In an embodiment, wrapper service 142a is a web service that serves as an endpoint for VAP platform 150a. Wrapper service 142a may be configured to specifically handle inbound and outbound requests in the protocol implemented by VAP platform 150a. Other wrapper services may be deployed to support VAP platforms that communicate using different protocols. As an example, wrapper service 142b converts incoming requests from a chat-based interface to the target protocol. Other wrapper services may be deployed to handle requests from an SMS-based virtual assistants and/or VAPs from different providers/vendors. The wrapper service endpoint may thus vary from one VAP to the next.

In an embodiment the converted request includes a context object. The context object may track the current state in a dialogue. Wrapper service 142a may map natural language inputs to intents in the context object. As an example, a request "I would like a medium pizza" maps "medium" to a size attribute within the context object. As another example, a request "I would like a pepperoni pizza" maps "pepperoni" to a toppings attribute within the context object. The context object may be used by execution engine 143 to determine how to transition between different nodes in the state diagram.

In an embodiment, execution engine 143 generates a response object based on the converted request (Operation 308). The response object may be generated by performing one or more tasks as defined in the state diagram specification. In some cases, the response may include information obtained from an external service. As an example, a response object includes weather information obtained from an external web service. As another example, a response object includes a confirmation obtained from a thermostat or other smart device being configured.

In an embodiment, execution engine 143 generates the response object based on a state diagram specification and a current context. The current context may be determined from a context object. As an example, a request "I would like a pepperoni pizza" prompts a response asking "What size?" as this information was not included in the natural language input or mapped to a corresponding intent. As another example, the request "I would like a medium pizza" prompts a response asking "What toppings would you like?". In yet another example, the request "I would like to order a pizza" prompts a response "What toppings would you like?" followed by "What size?" or vice versa depending on the flow defined in the state diagram. The response message may be determined from the nodes and transitions defined in the service specification. Techniques for executing context-based virtual assistant dialogues are described further in Section 5 below.

In an embodiment, the response object is generated according to the target protocol, which is platform-agnostic. The response object may follow a structured format defined by the target protocol. As an example, the target protocol defines a schema, such as a JSON schema or XML schema. The schema may include an element for containing a response, which may be delivered via a speaker, text message, and/or display depending on the VAP.

In an embodiment, wrapper service 142a receives the response object from execution engine 143 (Operation 310). Wrapper service 142a may then convert the response object to a response message consumable by the requesting VAP. The conversion format may follow the protocol implemented by the VAP. As an example, wrapper service 142a generates a response message that causes a smart speaker to play a natural language response as part of a dialogue with user 160a. As another example, wrapper service 142a generates a response message that causes a chat interface to display the natural language message as part of a chat dialogue with user 160a. As another example, wrapper service 142a generates a text message that is sent to user 160a as part of a text exchange.

VAP protocols may differ in multiple ways. For example, different VAP protocols may rely on different file formats, schemas, and/or encryption schemes. In an embodiment, wrapper service 142a converts a platform-generic response object to a platform-specific format. The conversion may involve converting the object to a platform-supported file format, formatting the file according to a platform-defined schema, and encrypting the file using a platform-supported encryption scheme. The format of the VAP response message may thus vary from one platform to the next.

In an embodiment, wrapper service 142a transmits the VAP response message to VAP 150a (Operation 312). The response message may contain a natural language output for presentation to user 160a.

In an embodiment, VAP 150 presents the natural language output to user 160a (Operation 314). This operation may include playing, texting, or displaying the natural language output to user 160a.

Execution engine 143 may execute several different specifications for VAP 150a and/or other VAPs. Execution engine 143 may select the service specification to load based on natural language inputs received from users, including users 160a-b. An invocation may be explicit (e.g., "Please launch SetThermostat service") or implicit (e.g., "Please set thermostat to 72 degrees"). The set of operations depicted in FIG. 3 may be repeated for each incoming request. Execution engine 143 may account for context during execution as described further below.

5. Context-Based Virtual Assistant Dialogue

Figure 4:
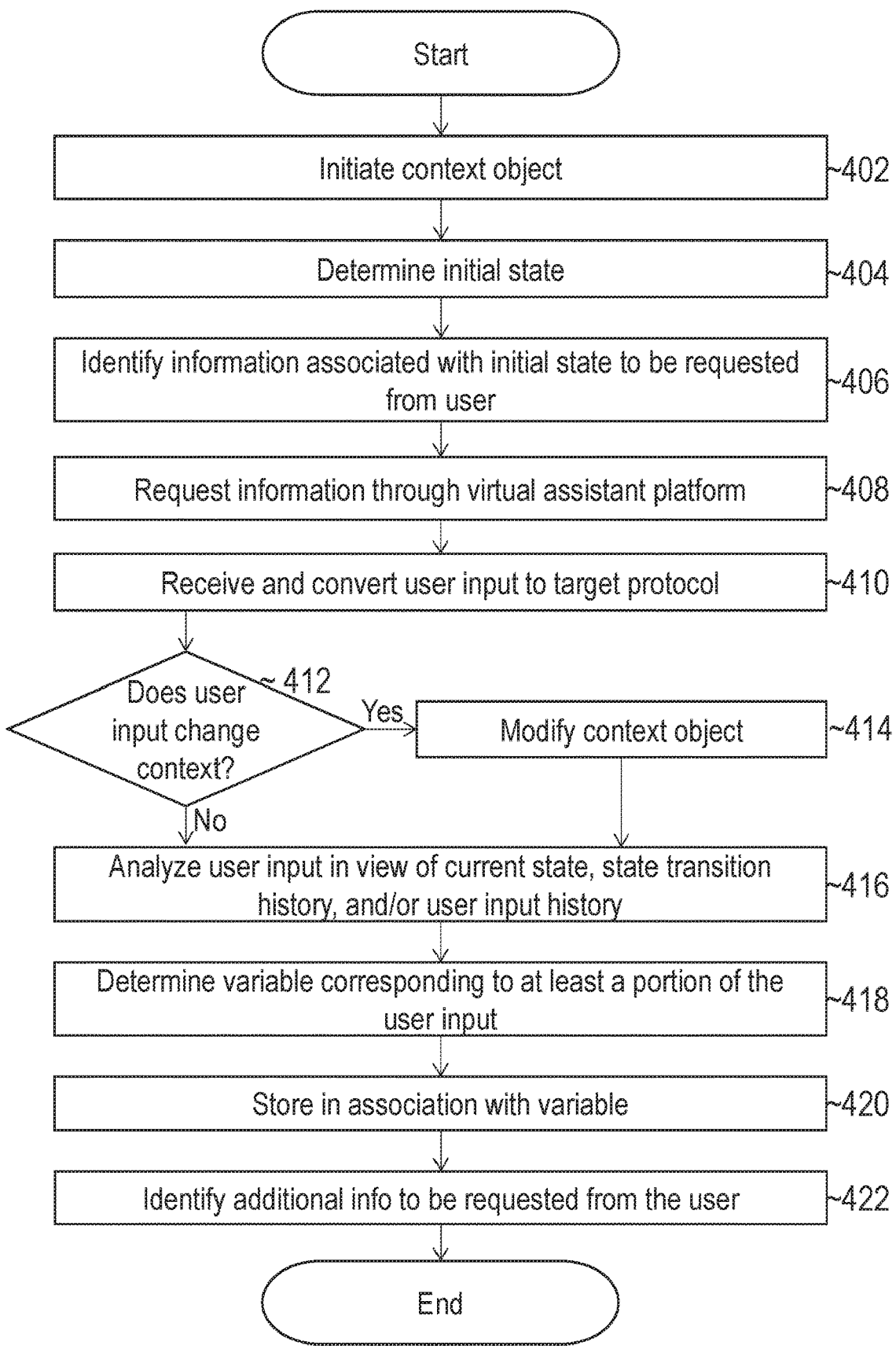
FIG. 4 illustrates an example set of operations for maintaining a context-based virtual assistant dialogue in a platform-agnostic environment in accordance with one or more embodiments and FIG. 5 shows a block diagram that illustrates a computer system in accordance with one or more embodiments.

FIG. 4 illustrates an example set of operations for executing a context-based virtual assistant dialogue in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, query system 140 initiates a context object (Operation 402). Query system 140 may create a context object corresponding to a particular dialogue. Query system 140 may allocate memory for the context object. Query system 140 may establish fields for information to be stored to the context object.

In an embodiment, query system 140 determines an initial state (Operation 404). Query system 140 may define a user-input-agnostic initial state. As an example, a user-input agnostic initial state is based on a substantially blank context object. In the user-input agnostic initial state, query system 140 may wait for user input. Alternatively, query system 140 may determine the initial state based on user input. As an example, query system 140 receives the voice input "Make a list." Query system 140 identifies an initial state of a list-making application.

In an embodiment, query system 140 identifies information, associated with the initial state, to be requested from the user (Operation 406). Query system 140 may use the context object to identify information associated with the initial state. As an example, the context object specifies that the current state is A987. The context object further specifies that, in state A987, the user's name is to be requested from the user.

In an embodiment, query system 140 requests information from the user through a VAP (Operation 408). Query system 140 may transmit instructions to the VAP to present a query requesting the identified information. Query system 140 may format the request based on a protocol implemented by the VAP. The VAP may play audio requesting the information. As an example, the VAP plays the audio message, "What would you like for lunch?" via a smart speaker. Alternatively, or additionally, query system 140 may transmit instructions to the VAP to display a text query via a visual interface. As an example, the VAP displays the text, "What would you like for lunch?" via a messaging interface.

In an embodiment, query system 140 receives and parses user input (Operation 410). The VAP may receive, from the user, an audio stream comprising voice input. The VAP may transmit a request message based on the audio stream to query system 140. The VAP may convert the audio stream to text. Alternatively, or additionally, the VAP may receive, from the user, text input. The VAP may include the text input in request message to query system 140.

By parsing the user input, query system 140 may identify different portions of the user input. Query system 140 may execute natural language analysis to interpret the user input. Query system 140 may isolate relevant words or phrases in the user input, based on the current state. Query system 140 may compare received text to template language associated with a task executable by the query system. One or more of these functions may alternatively be performed by the VAP. As an example, the VAP may map utterances to a set of one or more intents. Query system 140 may leverage the natural language analytic implemented by a VAP to perform complex tasks such as speech recognition.

In an embodiment, query system 140 determines whether the user input changes the context (Operation 412). Query system 140 may determine that the user input changes the context if the user input includes the requested information. As an example, state 7 is associated with receiving an address. Upon receiving the address, the context object is updated to the next state, state 8. Query system 140 may determine that the user input changes the context if the user input includes a new request. As an example, the system receives the user input "Wait, I want to send an email, not a text message." Accordingly, the context has changed. The state should be modified to reflect the new context.

In an embodiment, query system 140 modifies the context object (Operation 414). Query system 140 may modify the context object based on the user input, by storing information and/or updating the current state.

In an embodiment, query system 140 updates the current state of the context object. Query system 140 may modify the context object from a first state to a second state, based on the voice input being received while the context object is in the first state. Query system 140 may increment the state identification number. As an example, query system 140 receives user input associated with state 1. Accordingly, query system 140 increments the state identification number to state 2. Upon incrementing the state identification number, the context object may determine operations associated with the new current state. Query system 140 may identify a block of code to execute, based on the current state.

Modifying the context object may further comprise storing information to the context object. Query system 140 may store user input to the context object in association with a variable, as described below.

In an embodiment, query system 140 analyzes user input in view of the current state, state transition history, and/or user input history (Operation 416). Query system 140 may determine a context for the user input, based on the analysis.

In an embodiment, query system 140 determines an expected response in view of the current state. Query system 140 may retrieve a stored expected response type, based on the current state. As an example, the current state is R77. In state R77, query system 140 is configured to receive a bank account number. Accordingly, query system 140 selects an eleven-digit number from the user input.

In an embodiment, query system 140 analyzes user input in view of state transition history. Query system 140 may determine a context for the user input, based on one or more previous states in the current dialogue. As an example, when the context object was in state 1, query system 140 obtained the name of a traveler, Joe Smith, to add to a reservation. In state 2, query system 140 obtains the passport number of a traveler. Because the immediately preceding state identified traveler Joe Smith, query system 140 determines that the passport number is Joe Smith's. Alternatively, or additionally, query system 140 may determine a context for the user input based on one or more previous states in a prior dialogue.

In an embodiment, query system 140 analyzes user input in view of user input history. Query system 140 may determine a context for user input based on user input history in the current dialogue. Alternatively, or additionally, query system 140 may determine a context for user input based on user input history in a prior dialogue. As an example, in a prior dialogue, the user requested directions to Health Mart. When prompted for a location, the user selected a J Street location. Accordingly, the query system interprets a current request for directions to Health Mart as a request for directions to the J Street Health Mart location.

In an embodiment, query system 140 determines a variable corresponding to at least a portion of the user input (Operation 418). Query system 140 may identify a variable based on the context object. As an example, the context object includes a slot for receiving the variable account number. Query system 140 determines that a received number is an account number, corresponding to the account number slot. Alternatively, or additionally, query system 140 may identify values based on context in the user input. As an example, the user says, "My account number is 12345678." Based on the combination of a number and the words "account number," query system 140 identifies 12345678 as a value corresponding to the account number slot.

In an embodiment, query system 140 stores the corresponding portion of the user input in association with the variable (Operation 420). Query system 140 may store user input, corresponding to a variable, to the context object. Alternatively, or additionally, query system 140 may store user input, corresponding to a variable, to a data repository. Query system 140 may store a selected portion of the user input to a slot corresponding to the variable.

In an embodiment, query system 140 maps at least a portion of the user input to a corresponding variable. Query system 140 may map user input to a variable based on the current state. Query system 140 may map user input to a variable based on a prior state. Based on the mapping, query system 140 may store the input in association with the variable. Alternatively, or additionally, query system 140 may execute a query based on the mapping. As an example, query system 140 receives the user input, "Tell me the balance for my checking account." The system maps the request to a routine, lookupBalance. The routine includes an account number slot. The system maps "main checking account" to the account number slot.

In an embodiment, query system 140 may discard a portion of the voice input without mapping the portion to any variable. As an example, query system 140 receives the voice input, "I am the passenger." Query system 140 maps a portion of the input, "passenger" to a corresponding variable, user role. Query system 140 discards the remaining portion of the voice input, "I am the."

In an embodiment, query system 140 identifies additional information to be requested from the user (Operation 422). Query system 140 may identify additional information to be requested from the user based on information stored to the context object, such as the current state and/or user input history. Query system 140 may compare received input to an expected response type. Based on the expected response type, query system 140 may determine whether the required information has been received.

In an embodiment, the additional information to be requested from the user is identified based on a state transition. The context object may be updated to a new state, associated with a new variable to be accepted by the system. As an example, in state 5, the system receives a first name and a last name. Upon receiving the first name and last name, the context object is updated to state 6. In state 6, the system is configured to request an address.

In an embodiment, the additional information to be requested from the user is selected based on one or more user inputs received. Additional information to be requested from the user may be selected based on an order of receipt of two or more user inputs.

In an embodiment, the additional information to be requested from the user is selected based on time between the receipt of two or more user inputs. As an example, query system 140 receives two voice inputs. The first voice input is, "What is on the calendar for today?". The user is currently in San Francisco. The user has an appointment in San Jose. Query system 140 determines and presents the response, "You're going to San Jose." The system receives a second voice input, "What's the weather like?". If the second voice input is received on the same day as the first voice input, then the system presents the request, "Would you like the weather in San Jose or San Francisco?". On the other hand, if the second voice input is received a day after the first voice input, then the query system presents the weather in San Francisco, without requesting additional information.

In an embodiment, the additional information to be requested from the user is selected based on a lack of any intervening user input, which changes the context object, between the first voice input and the second voice input. In a particular state, the context object may be configured to accept two or more variables. If the required variables are not received, then the context object is not updated to the next state. Query system 140 may request additional information, corresponding to one or more variables associated with the current state. As an example, in state 5, the system is configured to receive a first name and last name. A user response, received while in state 5, includes a first name but not a last name. Accordingly, query system 140 determines that a last name is to be requested from the user.

In an embodiment, if additional information is to be requested from the user, then the system requests the additional information (Operation 408, described above).

If additional information is not to be requested from the user, then the system may terminate the dialogue. The system may generate an exit statement, prior to ending the dialogue. As an example, system may send an exit message that causes a smart speaker to play audio reciting, "Order confirmed. Goodbye."

The following detailed example illustrates operations in accordance with one or more embodiments. The following detailed example should not be construed as limiting the scope of any of the claims. The system receives the voice input, from a user, "Book a flight to Paris." The voice input, "book a flight," invokes the virtual assistant application BookTravel. The BookTravel application comprises a set of states, each state having a unique state identifier. The context object is set to state 0001, corresponding to a first state of the BookTravel application.

When the context object is in state 0001, the system requests a departure date. To request the departure date, the system plays the audio, "When would you like to leave?", via a smart speaker. When the context object is in state 0001, the system is configured receive and store user input corresponding to a departure date. The context object specifies that the departure date should be stored to a slot, DepartureDate, in the form MM/DD/YYY. The system receives the user input, "I want to leave on December 5." The system converts the voice input to text. The system executes natural language analysis to identify a date in the text. The system appends the current year to the received input, to generate the variable Dec. 5, 2017. The system stores the value Dec. 5, 2017 to the DepartureDate slot. The context object is updated from state 0001 to state 0002.

When the context object is in state 0002, the system is configured to request a return date. To request the return date, the system plays the audio, "When would you like to return?", via a smart speaker. When the context object is in state 0002, the system is configured receive and store user input corresponding to a return date. The input should be stored to a slot, ReturnDate, in the form MM/DD/YYYY. The system receives the user input, "I want to stay for ten days." The system converts the voice input to text. The system executes natural language analysis to determine that the user is providing a length of stay. The system converts the length of stay to a return date, generating the variable Dec. 15, 2017. The system stores the value Dec. 15, 2017 to the ReturnDate slot. The context object is updated from state 0002 to state 0003.

When the context object is in state 0003, the system is configured to request a destination, unless the destination has already been received from the user. The system analyzes user input history stored to the context object. The system determines that a destination has already been specified in the user's initial request. The system stores the destination, Paris, to a Destination slot. The context object is updated to state 0004.

When the context object is in state 004, the system is configured to identify flight information to present the flight information to the user. The system executes a query to a third-party travel booking application. The system passes the variables in the Destination, DepartureDate, and ReturnDate slots to the travel booking application. The system selects a flight, of a set of flights presented by the travel booking application. The system generates and plays the audio message: "OK. I found a roundtrip flight to Paris leaving December 5 and returning December 15, on France Airlines. It is $800 for economy class. Shall I book it?".

When the context object is in state 0004, the system is configured to receive a "yes" or "no" response. The system receives the voice input, "Yes." The system analyzes the user input, in light of the current state. Based on the current state, the system determines that the "yes" corresponds to an instruction to book the selected flight. The context object is updated to state 0005.

When the context object is in state 0005, the system is configured to book the selected flight. The system transmits a request to the travel booking application to purchase a roundtrip ticket for the selected flight. When the context object is in state 0005, the system is further configured to play a final message. The system plays the message, via a smart speaker, "OK. Your flight is booked. Goodbye." The system terminates the dialogue.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
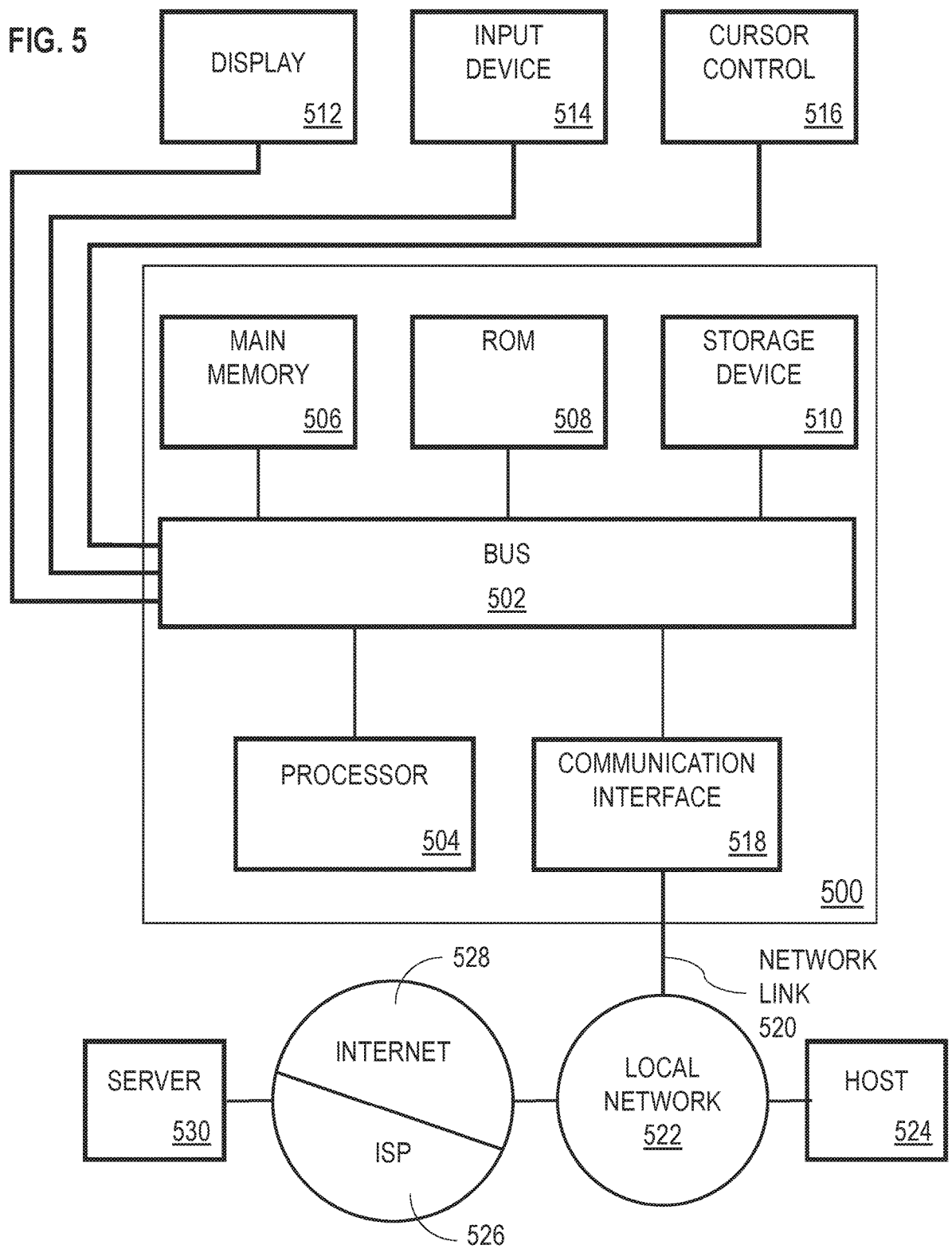

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

receiving, by a query system comprising an execution engine and a plurality of wrapper services, a specification for a skill, wherein the plurality of wrapper services includes (a) a first wrapper service for converting messages between a first protocol of a first virtual assistant platform and a target protocol and (b) a second wrapper service for converting messages between a second protocol of a second virtual assistant platform and the target protocol, wherein the specification for the skill defines a state diagram including a set of nodes representing different states in a natural language interaction and edges for transitioning between nodes based on intents determined from natural language inputs;

converting, by the first wrapper service, a request from the first virtual assistant platform to the target protocol, wherein the request invokes the skill;

generating, by the execution engine based on the specification for the skill and the request converted to the target protocol, a response;

converting, by the first wrapper service, the response to the first protocol of the first virtual assistant platform; and sending the response converted to the first protocol to the first virtual assistant platform.

2. The medium of claim 1, wherein the response includes a set of text and wherein instructions for converting, by the first wrapper service, the response to the first protocol of the first virtual assistant platform comprises instructions for formatting the text to be read out by the first virtual assistant platform via a smart speaker.

3. The medium of claim 1, wherein the response includes a set of text and wherein instructions for converting, by the first wrapper service, the response to the first protocol of the first virtual assistant platform comprises instructions for formatting the text to be presented by the first virtual assistant platform through at least one of a chat interface or a short message service text message.

4. The medium of claim 1, wherein the request from the first virtual assistant platform includes a voice input received through a smart speaker.

5. The medium of claim 1, wherein the specification is defined through a flowchart input within a graphical user interface of a specification editor.

6. The medium of claim 1, wherein instructions for generating the response include instructions for performing at least one operation defined in a node of the state diagram to obtain information from a network service and generating a response object that includes the information.

7. The medium of claim 1, wherein the instructions for generating the response include instructions for updating a context object based on a current state of a natural language interaction with a user.

8. The medium of claim 1, wherein the first virtual assistant platform and the second virtual assistant platform are smart speakers designed by different vendors.

9. The medium of claim 1, wherein at least one of the first virtual assistant platform and the second virtual assistant platform interact via a text-based interface.

10. The medium of claim 1, wherein the execution engine includes an interpreter for converting the specification for the skill to a set of executable instructions.

11. The medium of claim 1, wherein the specification for the skill is loaded by the execution engine responsive to receiving the request from the first virtual assistant platform.

12. The medium of claim 1, the instructions further causing operations comprising publishing the skill to the first virtual assistant platform and the second virtual assistant platform; wherein the same specification for the skill is used to enable a natural language ability on the first virtual assistant platform and the second virtual assistant platform.

13. The medium of claim 1, wherein the specification for the skill enables one or more natural language abilities; wherein the request that invokes the skill invokes a particular natural language ability of the one or more natural language abilities.

14. The medium of claim 1, wherein instructions for converting, by the first wrapper service, the response to the first protocol of the first virtual assistant platform include instructions for generating a data object comprising one or more attribute-value pairs that follow a format consumable by a virtual assistant platform to cause a smart speaker to output a natural language response to a voice input.

15. The medium of claim 1, wherein the instructions further cause performance of operations comprising:
converting, by the second wrapper service, a second request from the second virtual assistant platform to the target protocol, wherein the second request invokes the skill;
generating, by the execution engine based on the specification for the skill and the second request converted to the target protocol, a second response;
converting, by the second wrapper service, the second response to the second protocol of the second virtual assistant platform; and
sending the second response converted to the second protocol to the second virtual assistant platform.

16. The medium of claim 1, wherein the instructions further cause performance of operations comprising:
receiving, by the query system, a second specification for a second skill;
converting, by the first wrapper service, a second request from the first virtual assistant platform to the target protocol, wherein the second request invokes the second skill;
generating, by the execution engine based on the second specification for the second skill and the second request converted to the target protocol, a second response;
converting, by the first wrapper service, the second response to the first protocol of the first virtual assistant platform; and
sending the second response converted to the first protocol to the first virtual assistant platform.

17. The medium of claim 1, the instructions further causing operations comprising:
receiving an updated specification for the skill;
converting, by the first wrapper service without updating the first wrapper service, a second request from the first virtual assistant platform to the target protocol, wherein the second request invokes the skill;
generating, by the execution engine based on the updated specification for the skill and the request converted to the target protocol, a second response;
converting, by the first wrapper service without updating the first wrapper service, the second response to the first protocol of the first virtual assistant platform; and
sending the second response converted to the first protocol to the first virtual assistant platform.

18. A system comprising;
one or more hardware processors;
one or more non-transitory computer readable medium comprising instructions which, when executed by one or more hardware processors, causes performance of operations comprising:
executing a query system comprising an execution engine and a plurality of wrapper services, the plurality of wrapper services includes (a) a first wrapper service for converting messages between a first protocol of a first virtual assistant platform and a target protocol and (b) a second wrapper service for converting messages between a second protocol of a second virtual assistant platform and the target protocol;
receiving, by the query system, a specification for a skill, wherein the specification for the skill defines a state diagram including a set of nodes representing different states in a natural language interaction and edges for transitioning between nodes based on intents determined from natural language inputs;
converting, by the first wrapper service, a request from the first virtual assistant platform to the target protocol, wherein the request invokes the skill;
generating, by the execution engine based on the specification for the skill and the request converted to the target protocol, a response;
converting, by the first wrapper service, the response to the first protocol of the first virtual assistant platform; and sending the response converted to the first protocol to the first virtual assistant platform.

19. A method comprising:

receiving, by a query system comprising an execution engine and a plurality of wrapper services, a specification for a skill, wherein the plurality of wrapper services includes (a) a first wrapper service for converting messages between a first protocol of a first virtual assistant platform and a target protocol and (b) a second wrapper service for converting messages between a second protocol of a second virtual assistant platform and the target protocol, wherein the specification for the skill defines a state diagram including a set of nodes representing different states in a natural language interaction and edges for transitioning between nodes based on intents determined from natural language inputs;

converting, by the first wrapper service, a request from the first virtual assistant platform to the target protocol, wherein the request invokes the skill;

generating, by the execution engine based on the specification for the skill and the request converted to the target protocol, a response;

converting, by the first wrapper service, the response to the first protocol of the first virtual assistant platform; and sending the response converted to the first protocol to the first virtual assistant platform.

20. The system of claim 18, wherein the response includes a set of text and wherein instructions for converting, by the first wrapper service, the response to the first protocol of the first virtual assistant platform comprises instructions for formatting the text to be read out by the first virtual assistant platform via a smart speaker.

\* \* \* \* \*